United States Patent Office 3,824,225
Patented July 16, 1974

3,824,225
NON-CYCLOPOLYMERIZED POLY-1-VINYLURACILS
Howard Kaye, College Station, Tex., assignor to Research Corporation, New York, N.Y.
No Drawing. Filed Aug. 18, 1971, Ser. No. 172,928
Int. Cl. C08f 7/12
U.S. Cl. 260—88.3 R          2 Claims

ABSTRACT OF THE DISCLOSURE

It has been discovered that stereoregular non-cyclopolymerized poly-1-vinyluracils are produced under conditions wherein cyclopolymerization is substantially completely repressed by carrying out γ-radiation initiated polymerization of a vinyluracil, such as the compound 1-vinyluracil, under conditions wherein, (1) polymerization is carried out at a low temperature;
(2) polymerization is carried out at high concentration of the monomer;
(3) polymerization is carried out in the solid state;
(4) polymerization is carried out employing negatively charged monomers and/or
(5) polymerization is carried out wherein the monomers, the 1-vinyluracils, contain bulky substituent groups.

Combinations of the aforesaid polymerization conditions are usefully employed to produce the desired stereoregular non-cyclopolymerized poly-1-vinyluracils.

---

This invention relates to vinyl polymer analogs of nucleic acids and particularly to the preparation of polymerized vinyl-substituted organic bases such as polymerized vinyl-substituted pyrimidines.

In copending patent application Ser. No. 881,595 filed Dec. 2, 1969, now U.S. Pat. 3,664,991 of which this application is a continuation-in-part, there is disclosed the preparation of certain vinyl-substituted purines and vinyl-substituted pyrimidines. The poly-1-vinyluracil in the above-identified patent application is primarily cyclopolymerized poly-1-vinyluracil. The preparation of cyclopolymerized 1-vinyluracil is also disclosed in the article entitled "Cyclopolymerization of 1-Vinyluracil" by Howard Kaye, which appeared in *Macromolecules*, vol. 4, pages 147–152, March-August (1971). The disclosures of this article and the disclosures of the above-identified patent application are herein incorporated and made part of this disclosure.

It is an object of this invention to provide stereoregular non-cyclopolymerized vinyl polymer analogs of nucleic acids.

It is a particular object of this invention to provide stereoregular non-cyclopolymerized vinyl-substituted pyrimidines.

It is another object of this invention to provide stereoregular non-cyclopolymerized 1-vinyluracils having varying degrees of tacticity (different geometric arrangements of uracil rings on the backbone), and particularly such non-cyclopolymerized uracils wherein all the uracil rings are available for base-pairing with polynucleotides and in other biochemical reactions.

How these and other objects of this invention are accomplished will become apparent in the light of the accompanying disclosure. In at least one embodiment of the practice of this invention at least one of the foregoing objects will be achieved.

In accordance with the practices of this invention there is produced non-cyclopolymerized poly-1-vinyluracils. More particularly in accordance with this invention there is produced stereoregular non-cyclopolymerized poly-1-vinyluracils, such as stereoregular non-cyclopolymerized poly-1-vinyluracil (PVU). These non-cyclopolymerized vinyl-substituted uracil polymers, particularly the 1-vinyluracil polymers, are produced by radiation-initiated polymerization of the vinyl-substituted uracils, such as a substituted 1-vinyluracil and particularly the compound 1-vinyluracil, under conditions in accordance with this invention which tend not to bring about cyclopolymerization of the monomers undergoing polymerization.

In accordance with this invention it has been found that in radiation-initiated polymerizations of substituted uracil, such as a 1-vinyluracil, e.g. the compound 1-vinyluracil, cyclopolymerization is substantially completely inhibited or repressed and stereoregular non-cyclopolymerized polymers are obtained by carrying out the radiation-initiated polymerization under one or more of the following conditions:

(1) polymerization at a low temperature;
(2) polymerization employing a high concentration of a monomer;
(3) polymerization in the solid state;
(4) polymerization employing negatively charged monomers; and
(5) polymerization of monomers which contain one or more bulky substituents or substituent groups.

The following examples are illustrative of the practices of this invention:

Example No. 1

Gamma-radiation initiated polymerization of the compound 1-vinyluracil was carried out in aqueous ammonia solutions. It was observed that as the temperature of the solutions was lowered from 0° C. to −78° C., the percent cyclopolymerized product decreased from 20% to 0%. Polymerization of the compound 1-vinyluracil was carried out in liquid ammonia, an even more convenient solvent because higher concentrations of the monomer could be obtained therein. The polymerization was carried out at a temperature of −78° C. In these experiments, see Experiments Nos. 1, 2 and 3 in accompanying Table I involving low temperature gamma-radiation-initiated polymerization of the compound 1-vinyluracil in ammonia solutions, the percent uracil in the resulting polymers was determined from the nuclear magnetic resonance spectra by integration of the uracil N—H proton at δ 11.44.

Example No. 2

Gamma-radiation-initiated polymerization of 1-vinyluracil was also carried out in aqueous sodium hydroxide solutions, such as 2 M and 7 M NaOH since aqueous NaOH was found to be an excellent solvent for 1-vinyluracil. At 0° C. this system becomes a highly viscous liquid. The very high concentrations of monomer which are obtainable in this system, however, enables one to take advantage of the decrease in cyclopolymerization with increase in monomer concentration. In this system, moreover, 1-vinyluracil becomes negatively charged and this condition further decreased the extent of cyclopolymerization because of electrostatic repulsion between the penultimate and growing chain end uracils. It was observed that gamma-radiation-initiated polymerization at 0° C. led to substantially pure non-cyclopolymerized poly-1-vinyluracil, see particular Experiment No. 5 in accompanying Table 1. Extremely rapid rates of polymerization were observed in this solvent system probably because the termination rate constant was decreased in the viscous medium. It was also observed that the nuclear magnetic resonance spectrum at 170° C. was identical to that obtained with respect to the polymerization product of Experiment No. 3, see accompanying Table I.

When the gamma-radiation irradiation was carried out at 0° C. for more than 3 hours increasing amounts of cross-linked polymers were found, see Experiment No. 6 of accompanying Table 1. At −78° C. the 7 M NaOH solution became a rigid glass and polymerization led to either 7.8% cyclopolymerization or free radical attack on the uracil rings along with some cross-linked material, see Experiment No. 7 of accompanying Table I. This result was surprising in the light of the results obtained in connection with the low temperature experiments employing ammonia solutions.

Example No. 3

The gamma-radiation-initiated polymerization of 1-vinyluracil in the solid state at 40° C. for a period of about 4 days led to the production of pure poly-1-vinyluracil with the complete absence of any cyclopolymerization, see Experiment No. 9 in accompanying Table I. It would appear that 1-vinyluracil probably exists in the solid state as hydrogen bonded dimers and the resulting rigid orientation of the rings in the crystal may have prevented the penultimate and growing chain end uracils to be in the proper conformation for cyclopolymerization. Although carried out at higher temperatures the solid state polymerization of 1-vinyluracil was much slower than the −78° C. polymerization in liquid ammonia. At much higher doses of gamma-radiation lower yields and cross-linking were observed, see Experiment No. 10 of Table I.

Example No. 4

The polymerization of 6-methyl-1-vinyluracil was also carried out. It was not expected that 6-methyl-1-vinyluracil would cyclopolymerize as readily as 1-vinyluracil because it would appear that 6-methyl groups would sterically inhibit the proper orientation of the rings for cyclopolymerization. It was found that gamma-radiation-initiated polymerization in water at 0° C. and 25° C. led to poly-6-methyl-1-vinyluracil with the complete absence of cyclopolymerized units, see Experiments 11 and 12 of accompanying Table.

The results of the experiments reported in the above examples are further reported in accompanying Table I. In carrying out these experiments a 25,000 Curie cobalt 60 source was used at the source of gamma-radiation and dose rates were determined with a Frick dosimeter. In the gamma-radiation initiated polymerization experiments reported in accompanying Table I the monomers either in solution or in the solid state were degassed in glass polymerization tubes under 0.1 mm. Hg vacuum at −78° C. for at least 20 minutes. The tubes were sealed under vacuum and then irradiated under the conditions reported in accompanying Table I. The polymers were isolated by precipitation, and washed with methanol, dissolved in 0.1 M sodium hydroxide, filtered through millipore Teflon filters and precipitated by acidification with 0.1 M hydrochloric acid. After washing the polymers with distilled water several times the polymers were dried at 150° C. at an absolute pressure of 0.1 mm. Hg overnight.

initiate polymerization of the monomers. Gamma radiation is particularly useful since gamma ray emitting sources, e.g. cobalt 60, are readily available. Although gamma radiation is preferred in the practice of this invention other radiation and radiation sources, penetrative ionizing radiation and sources emitting the same, are also useful, such as high energy alpha, beta and X-ray radiation. Although neutrons are useful as penetrative ionizing radiation, particularly from the point of view of penetrability, the use of neutrons in the practice of this invention is less desirable because of the tendency of neutrons to induce radioactivity in the materials exposed to them.

The penetrative ionizing radiation of the type useful in the practice of this invention may be supplied by naturally occurring radioactive materials, such as radium and its compounds, which emit alpha, beta and gamma rays. Fission by-products and processes generating atomic power and/or fissionable materials which emit high energy gamma rays provide a highly desirable and abundant source of penetrating ionizing radiation suitable for use in the practices of this invention. Devices for generating X-rays or high velocity electrons, such as electron accelerators, e.g. Van de Graff accelerators and betatrons, are also useful for providing the penetrative ionizing radiation in the practice of this invention. In general, however, gamma radiation is preferred in the practices of this invention because of its relatively high penetrating power and the availability of sources which yield gamma radiation.

In the radiation-initiated polymerization of 1-vinyluracil and substituted 1-vinyluracils in accordance with the practices of this invention it is desirable that the polymerization be carried out at a low temperature, such as a temperature in the range below 0° C., preferably in the range from about −80° C. to about −80° to −100° C., more or less. Desirably, also, in the polymerization of the range from about −20° C. to about −80° to −100° that these monomeric materials undergoing polymerization be maintained at a relatively high concentration, such as a concentration of at least about 10%, preferably above about 15–20%, by weight in the polymerization system. As indicated hereinabove, useful results are obtainable when the monomers are present in the solid state or when negatively charged. When substituted vinyluracils, particularly substituted 1-vinyluracils are employed, it is preferred that relatively bulky substituent groups, such as methyl, ethyl, propyl, isopropyl, phenyl and the like substituent groups, be employed such as in the 6th position, since such compounds undergo radiation-initiated polymerization in accordance with the practices of this invention with substantially little, if any, cyclopolymerization.

The materials of this invention are useful in the preparation of coatings and films and such coatings and films exhibit relatively good thermal properties. These materials adhere well to substrates, particularly to glass. Accordingly, the materials of this invention are useful as coatings for glass surfaces, such as windows. Particularly useful TABLE I.—Polymerization of 1-vinyluracil (1-VU) and 6-methyl-1-vinyluracil (6-Me-1-VU)

| Monomer | Example | Solvent | Conc., percent | Dose rate, r./hr.× 10⁻⁵ | Temp., °C. | Time, hours | Yield, percent | Percent Uracil by NMR |
|---|---|---|---|---|---|---|---|---|
| 1-VU | 1 | 20% NH₄OH | 17 | 2.52 | 0 | 14.5 | 83 | 80 |
| 1-VU | 2 | 50% NH₄OH | 3.5 | 4.07 | −78 | 117 | 78.2 | 100 |
| 1-VU | 3 | liq. NH₃ | 15 | 4.07 | −78 | 14 | 35 | 100 |
| 1-VU | 4 | 2 M NaOH | 15 | 4.07 | 0 | 6 | 58 | 98 |
| 1-VU | 5 | 7 M NaOH | 45 | 4.07 | 0 | 0.5 | 17 | 100 |
| 1-VU | 6 | 7 M NaOH | 45 | 4.07 | 0 | 3 | ¹30 | |
| 1-VU | 7 | 7 M NaOH | 45 | 4.07 | −78 | 6 | ¹18.6 | 92.2 |
| 1-VU | 8 | 7 M NaOH | 22 | 4.07 | −190 | 0.16 | 6 | |
| 1-VU | 9 | Solid state | | 4.07 | 40 | 94 | 15.5 | 100 |
| 1-VU | 10 | ...do... | | 4.07 | 40 | 240 | ¹2.66 | |
| 6-Me-1VU | 11 | H₂O | 10 | 2.52 | 25 | 6 | 36 | 100 |
| 6-Me-1VU | 11 | H₂O | 10 | 2.52 | 0 | 6 | 10 | 100 |

¹ Some crosslinking.

In the practices of this invention as particularly described hereinabove, gamma radiation was employed to for such purposes are non-cyclopolymerized poly-1-vinyluracil and poly-6-methyl-1-vinyluracil.

As will be apparent to those skilled in the art in the light of the foregoing disclosure many modifications, alterations and substitutions are possible in the practice of this invention without departing from the spirit or scope thereof.

I claim:
1. Stereoregular non-cyclopolymerized poly - 1 - vinyluracil.
2. Stereoregular non-cyclopolymerized poly-6-methyl-1-vinyluracil.

References Cited
UNITED STATES PATENTS

| | | | |
|---|---|---|---|
| 2,712,537 | 7/1955 | D'Alelio | 260—88.3 R |
| 3,557,061 | 1/1971 | Hamann | 260—88.3 R |

HARRY WONG, JR., Primary Examiner

U.S. Cl. X.R.

117—124, 161; 204—159.22; 260—29.6 HN

UNITED STATES PATENT OFFICE
CERTIFICATE OF CORRECTION

Patent No. 3,824,225        Dated July 16, 1974

Inventor(s)    Howard Kaye

It is certified that error appears in the above-identified patent and that said Letters Patent are hereby corrected as shown below:

Col. 3, Table I, the second heading "Example" should correctly read -- Experiment --

Col. 3, Table I, second column, last line "11" should correctly read -- 12 --

Col. 4, line 29, the first two sentences of this paragraph should correctly read:

-- In the radiation-initiated polymerization of 1-vinyluracil and substituted 1-vinyluracils in accordance with the practices of this invention it is desirable that the polymerization be carried out at a low temperature, such as a temperature in the range below 0°C., preferably in the range from about -20°C. to about -80 to -100°C., more or less. Desirably, also, in the polymerization of the above-indicated monomeric materials it is desirable that these monomeric materials undergoing polymerization be maintained at a relatively high concentration, such as a concentration of at least about 10%, preferably above about 15-20%, by weight in the polymerization system. --

Signed and sealed this 5th day of November 1974.

(SEAL)
Attest:

McCOY M. GIBSON JR.        C. MARSHALL DANN
Attesting Officer          Commissioner of Patents